United States Patent Office 3,591,639
Patented July 6, 1971

3,591,639
PREPARATION OF AMINES FROM N-SUBSTITUTED AMIDES
Harlan E. Tiefenthal, Western Springs, and Eugene J. Miller, Jr., Wheaton, Ill., assignors to Armour Industrial Chemical Company
No Drawing. Filed Nov. 2, 1967, Ser. No. 680,036
Int. Cl. C07c 85/12
U.S. Cl. 260—583
12 Claims

ABSTRACT OF THE DISCLOSURE

A process for preparation of primary and secondary amines comprising reacting an N-substituted amide with ammonia at an elevated temperature forming an amine and unsubstituted amide which in the presence of a catalyst dehydrates the unsubstituted amide to a nitrile. The amines formed by this reaction are useful as mineral flotation agents, biocides, and as intermediates to form surface active chemicals and nitrogen derivative compounds such as diamines, quaternary ammonium compounds and the like.

BACKGROUND OF THE INVENTION

The prior art methods for converting N-substituted amides to amines have been hydrolysis of the amide in suitable acid or base aqueous or alcoholic solutions. Hydrolysis agents which have been used previously include aqueous sulfuric acid, aqueous sodium hydroxide sodium hydroxide in alcohol and aqueous alcohol, aqueous potassium hydroxide, potassium hydroxide in alcohol and aqueous alcohol, and sodium methoxide in alcohol, at about 50% concentration. U.S. Pat. 3,338,967 illustrates the hydrolysis of N-substituted amides to amines using prior art methods. Previously used hydrolysis techniques for conversion of N-substituted amides to amines have severe disadvantages in that the systems are extremely corrosive to the containment vessels at the high temperatures which must be employed to obtain satisfactory conversion to the amine. Further, even at pressures in the order of 5 atmospheres long reaction times in the order of 1 to 10 hours are required in order to obtain high conversion from the N-substituted amide to the amine. The products obtained from N-substituted amides by conventional hydrolysis techniques are contaminated with salts of the hydrolysis agents an dextensive purification and distillation techniques must be employed to obtain commercially acceptable amines.

SUMMARY OF INVENTION

We have discovered that many disadvantages inherent in production of amines by hydrolysis of N-substituted amides are avoided by reacting an N-substituted amide with ammonia at an elevated temperature and in the presence of a dehydration catalyst. The dehydration catalyst converts the unsubstituted amide formed in the reaction to the corresponding nitrile. We have found that by utilizing this new process we can obtain near quantitative yields of primary and secondary amines which may be readily recovered in a form which is suitable for many applications without further purification. Further, our reaction may be carried out in ordinary chemical process equipment, such as constructed from mild steel, without presenting corrosion problems. Our process is especially well suited for continuous flow vapor phase systems in which conversion to the amine requires only a few seconds contact time.

It is an object of our invention to provide an efficient process for the conversion of N-substituted amides to amines in a relatively non-corrosive medium.

It is a further object to provide a process for conversion of N-substituted amides to amines in short periods of time at atmospheric, or slightly higher, pressure, thus obviating requirements for high pressure process equipment.

It is still another object of our invention to provide a process for conversion of N-substituted amides to commercially acceptable amines with little or no further purification and distillation.

It is an object to provide a process for production of primary and secondary amines from N-substituted amides by a continuous flow process.

These and other objects which will become apparent from the further description are obtained by the process of our invention.

Our process may be illustrated by the following equation:

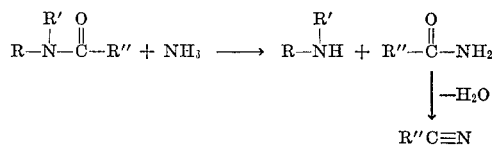

wherein R is selected from the group consisting of alkyl and alkenyl radicals having from 1 to about 22 carbon atoms wherein the carbon atom attached to the nitrogen is selected from the group consisting of primary, secondary and tertiary carbon atoms; alicyclic radicals having from 4 to 12 carbon atoms; and mono- and bicyclic aryl radicals having from 6 to 16 carbon atoms and their lower alkyl, amino ($-NH_2$) and cyano substituted derivatives; R' is selected from H and the same radicals as R, provided that the total number of carbon atoms in R and R' combined is less than about 30; and R" is selected from H and the same radicals as R, provided that the total molecule contains less than 31 carbon atoms. The alkyl and alkenyl radicals may be straight chain or branched chain wherein the branch may be symmetrical or unsymmetrical, and they may be substituted with non-interfering groups. Particularly suitable substitutions include amino and cyano derivatives. Mixtures of mono-substituted amides having different groups may be used as well as mixtures of mono- and di-substituted amides. The di-substituted amides may be symmetrical or unsymmetrical with respect to the substitution on the nitrogen atom.

The process of our invention for preparing primary and secondary amines can be carried out using any suitable method of vaporizing an N-substituted amide into an ammonia stream, reacting the N-substituted amide with ammonia to form the desired amine and an unsubstituted amide, maintaining the formed amide in the vapor state in the ammonia stream and passing the vapors over a catalyst to dehydrate the formed amide to its corresponding nitrile. The reaction takes place very quickly in the vapor phase, contact time of as little as 1 second produces high yields of product.

We prefer to introduce the amide into a vaporizing chamber which is maintained at a temperature sufficient to vaporize the amide. Usually from about 200 to 350° C. is suitable to vaporize the amide. A preferred temperature range for most amide is from 220° to 300° C.

It is preferred to introduce the ammonia in a vapor state in a molar excess, based upon the amide. The stoichiometry of the reaction requires one mole of ammonia per mole of amide. When the amide reactant has a low boiling point, and is thus readily vaporized, ammonia in amounts close to the stoichiometric requirement may be used. When higher boiling point amides are used, it is desirable to use an excess of ammonia to serve as a carrier, and it is suitable to use a molar ratio of ammonia to amide of from about 2:1 to 70:1. Ratios of ammonia to amide higher than 70:1 may be used, but do not appear to offer any particular advantage. Ratios of from about 6:1 to 12:1 are preferred. Ratios of about 9:1 appear to be particularly suitable for the reactions using N-(sec alkyl)acetamide as reactants. One preferred embodiment is to introduce the gaseous ammonia directly into the liquid amide in the heated vapor chamber.

The vaporized amide in the ammonia stream is carried from the vaporizing chamber through a catalyst chamber which is maintained at a sufficiently high temperature to maintain the amide as a vapor in the ammonia stream. Suitable catalyst temperatures range from 200 to 350° C., from about 250 to 320° C. are preferred. Especially desirable results are obtained with most amides when the catalyst temperature is maintained from 280 to 310° C. It is known that amines deaminate with heat and it is surprising that deamination does not present a greater problem in our process. However, for this reason, temperatures greatly in excess of those necessary to maintain the vapor phase are not desired.

The catalyst may be any suitable catalyst for conversion of amides to nitriles in the vapor phase. Such catalysts are well known in the art, such as bauxite, purified aluminum oxide, MgO, and aluminosilicates. We have found that bauxite is especially suitable.

Our process may be carried out at about atmospheric pressure. However, slight positive pressures can be used for highly volatile amides in order to attain the proper reaction temperature, while sub-atmospheric pressures can be used for amides of low volatility in order to bring the amide into the reaction zone at a suitable temperature. Pressures from about 50 mm. to 3 atmospheres are suitable.

It can be observed from the above reaction conditions that a wide variety of equipment may be used to carry out the process of our invention. Basically, any vapor phase nitrile unit may be used. We have found that corrosion is not a problem in our process and that mild steel process equipment is suitable. As can be seen from the above formula illustrating the reaction of our process, transamidation and conversion of the formed amide into a nitrile takes place within the catalyst chamber. Thus, the effluent from the catalyst chamber may be passed through a hot condenser to condense the amine. The effluent from the hot condenser, containing ammonia, water, and nitrile, may then be passed through a suitable ammonia recovery system and the ammonia may be recycled. The water and nitrile are collected for further purification.

It is seen from the above equation illustrating our process, that the reactant amide is converted to the corresponding amine and nitrile with only the consumption of ammonia. Although it is usually desirable to use an excess of ammonia, the ammonia may be easily recovered from the product and returned to the vaporizer pot. It is readily seen that the process of our invention is especially well suited to a continuous process for the manufacture of amines which produces amines of sufficient purity for many commercial uses without further purification.

The following examples are presented to illustrate the present invention.

Example I 153.5 grams of N-($C_{11}$-$C_{14}$ sec-alkyl)acetamide (82.6% amide, 6.1% amine, 3.7% $H_2O$; I.V. 15.9) were added to a heated flask having an exit passing into a vapor phase catalyst chamber packed with bauxite. The exit of the catalyst chamber passed through a second flask and water cooled reflux condenser into a third flask, which was vented to atmosphere through a cooled reflux condenser. The temperature of the acetamide in the first flask was raised and maintained at about 245° to 255° C. and $NH_3$ bubbled through the acetamide at a rate of 2.0 to 3.2 liters per minute over a 5½ hour period. The catalyst temperature was from 270° to 290° C. At the end of the 5½ hour period, the first flask contained 15.3 grams of residue (mainly amide) while the second flask contained a crude yield of 99.4 grams of material having the following analysis:

| | Percent |
|---|---|
| Amine | 91.0 |
| Amide | 0.7 |

I.V.—9.8.

The theoretical yield of amine was 103.0 grams while the actual yield of amine was 90.5 grams resulting in an overall amine yield of 87.7% (N-($C_{11}$-$C_{14}$ sec-alkyl)amine).

Example II

Using the same apparatus and reactants as in Example I, the reaction was repeated using 154.5 grams of N-($C_{11}$-$C_{14}$ sec-alkyl)acetamide, an ammonia flow of 2.0 to 3.2 liters per minute for 4 hours, a pot temperature of 240° to 250° C., catalyst temperature of 265 to 285° C. 9.0 grams of residue remained and 120.3 grams of crude product was produced having the following analysis:

| | Percent |
|---|---|
| Amine | 82.4 |
| Amide | 1.3 |

I.V.—6.4.

The theoretical yield of amine was 108 grams while the crude yield of amine was 99.2 grams resulting in an overall amine yield of 91.8% (N-($C_{11}$-$C_{14}$ sec-alkyl) amine).

Example III

Using the apparatus described in Example I, N-(n-dodecyl)neoheptanamide (408.5 grams) was charged into the reaction pot and an $NH_3$ flow rate from 2.0 to 3.2 liters per minute was maintained for 2½ hours. The reaction pot temperature was maintained at from 330 to 340° C. and the bauxite catalyst temperature was from 295 to 305° C. After termination of the $NH_3$ flow, 16.6 grams of residue remained having the analysis:

| | Percent |
|---|---|
| Amide | 79.0 |
| Amine | 2.6 |

Crude product (357.7 grams) having the following analysis was obtained:

| | Percent |
|---|---|
| Amine | 66.8 |
| Amide | <1 |
| Nitrile | 31.3 |
| Olefin | <1 |

The overall amine yield was 97.8% and the overall nitrile yield was 76.7% (n-dodecylamine).

Example IV

Using the apparatus described in Example I, N-(n-dodecyl)-caproamide (403.4 grams) was charged into the reaction pot and an $NH_3$ flow rate of 2.6 liters per minute was maintained for 4½ hours. The reaction pot temperature was maintained at from 330 to 340 C. and the bauxite catalyst temperature was from 300 to 315° C. After termination of the $NH_3$, uow, 3.1 grams of residue remained. Crude product (369 grams) having the following analysis was obtained:

| | Percent |
|---|---|
| Amine | 59.1 |
| Amide | <1 |
| Nitrile | 35.9 |
| Olefin | 2.6 |

The overall amine yield was 83.4% and the overall nitrile yield was 96.5% (n-dodecylamine).

Example V

Using the apparatus described in Example I, N-(tert-dodecyl)-formamide (165.4 grams) was charged into the reaction pot and an $NH_3$ flow rate from 2.6 to 3.8 liters per minute was maintained for 6 hours. The reaction pot temperature was maintained at from 235 to 250° C. and the bauxite catalyst temperature was from 280 to 295° C.

Crude product (118.5 grams) having the following analysis was obtained:

| | Percent |
|---|---|
| Amine | 46.0 |
| Amide | 0 |
| Nitrile | 0 |
| Olefin | 51.0 |

The overall yield of N-tert-dodecylamine was 37.4%.

Example VI

Using the apparatus described in Example I, N,N-dioctyl acetamide (145.2 grams) was charged into the reaction pot and an $NH_3$ flow rate from 0.5 to 1.0 liters per minute was maintained for 4½ hours. The reaction pot temperature was maintained at from 230 to 250° C. and the bauxite catalyst temperature was from 270 to 290° C. After termination of the $NH_3$ flow, 12.6 grams of residue were found in the reaction pot. The crude product (105.5 grams) was analyzed and found to contain about 100% amine. The overall yield of dioctylamine was 88.4%.

Example VII

Using the apparatus described in Example I, N-methyl-N-dodecyl-acetamide (151.1 grams) was charged into the reaction pot and an $NH_3$ flow rate from 2.0 to 3.2 liters per minute was maintained for 6 hours. The reaction pot temperature was maintained at from 220 to 240° C. and the bauxite catalyst temperature was from 275 to 295° C. After termination of the $NH_3$ flow, there was a negligible amount of residue in the reaction pot. Crude product (120.3 grams) having the following analysis was recovered:

| | Percent |
|---|---|
| Amine | 96.7 |
| Amide | 0.1 |
| Nitrile | <2 |
| Olefin | 1.7 |

The overall yield of N-methyl-N-dodecylamine was 98.8%.

Example VIII

Using the apparatus described in Example I, m-acetotoluidide (502 grams) was charged into the reaction pot and an $NH_3$ flow rate from 1.5 to 2.0 liters per minute was maintained for 5 hours. The reaction pot temperature was maintained at from 280 to 285° C. and the bauxite catalyst temperature was from 280 to 300° C. After termination of the $NH_3$ flow, 3.0 grams of residue were found in the reaction pot. Crude product (443.6 grams) having the following analysis was recovered:

| | Percent |
|---|---|
| Amine | 81.0 |
| Amide | 1.9 |

The overall yield of toluidine was 101%.

Example IX

Using the apparatus described in Example I, N-(sec-dodecyl)acrylamide (153.4 grams) was charged into the reaction pot and an $NH_3$ flow rate from 2.0 to 4.4 liters per minute was maintained for 4½ hours. The reaction pot temperature was maintained at from 245 to 287° C. and the bauxite catalyst temperature was from 250 to 295° C. After termination of the $NH_3$ flow, 46.1 grams of residue were found in the reaction pot. The residue contained 1.6% amine. Crude product (79.7 grams) having the following analysis was recovered:

| Amine: | Percent |
|---|---|
| Primary | 84.6 |
| Secondary | 4.3 |
| Amide | Nil |
| Nitrile | 4.3 |
| Olefin | 6.2 |

The overall yield of N-(sec-dodecyl)primary amine was 56.9%.

Example X

Using the apparatus described in Example I, N-cyclohexyl-acetamide (150.5 grams) was charged into the reaction pot and an $NH_3$ flow rate from 0.75 to 1.0 liter per minute was maintained for 3½ hours. The reaction pot temperature was maintained at from 227 to 265° C. and the bauxite catalyst temperature was from 280 to 290° C. After termination of the $NH_3$ flow, 1.4 grams of residue were found in the reaction pot. Crude product (127.5 grams) having the following analysis was recovered:

| | Percent |
|---|---|
| Amine | 68.5 |
| Amide | 13.2 |

The overall yield of cyclohexylamine was 84.0%.

Example XI

Using the apparatus described in Example I, N,N-(dicylohexyl)acetamide (150.2 grams) was charged into the reaction pot and an $NH_3$ flow rate of from 0.5 to 2.6 liters per minute was maintained for 4 hours. The reaction pot temperature was maintained at from 230 to 290° C., and the bauxite catalyst temperature was from 260 to 290° C. After termination of the $NH_3$ flow, 6.2 grams of residue remained in the reaction pot. Crude product (109.6 grams) having the following analysis was recovered:

| | Percent |
|---|---|
| Amine | 95.6 |
| Amide | 1.6 |

The overall yield of dicyclohexylamine was 86.5%.

Example XII

Using the apparatus described in Example I, N-octylbenzamide (148.8 grams) was charged into the reaction pot and an $NH_3$ flow rate of from 2.0 to 5.6 liters per minute was maintained for 6 hours. The reaction pot was maintained at from 250 to 260° C. and the bauxite catalyst temperature was from 260 to 290° C. After termination of the $NH_3$ flow, a negligible amount of residue remained in the reaction pot. Crude product (91.9 grams) having the following analysis was recovered:

| | Percent |
|---|---|
| Amine | 51.7 |
| Amide | 0.2 |
| Nitrile | 44.6 |
| Olefin | 1.5 |

The overall yield of octylamine was 92.8% and the overall nitrile yield was 62.3%.

Example XIII

Using the apparatus described in Example I, acetamidostearylamine (77.4% active—150.3 grams), derived from oleylamine which was derived from oleic acid, was charged into the reaction pot and an $NH_3$ flow rate of from 1.5 to 3.2 liters per minute was maintained for 4½ hours. The reaction pot was maintained at from 288 to 310° C. After termination of the $NH_3$ flow, 47.6 grams of residue remained in the reaction pot and had the following analysis:

| | Percent |
|---|---|
| Diamine | 17 |
| Amide | 78.6 |

Crude product (56.7 grams) having the following analysis was recovered:

| | Percent |
|---|---|
| Diamine | 68.5 |
| Aminoamide | 10.5 |
| I.V.—20.3. | |

The overall yield of aminostearylamine (predominately 9,10-aminostearylamine) was 55.4%.

Example XIV

Using the apparatus described in Example I, catalysts other than bauxite were packed in the catalyst column and the reactions performed under the conditions shown in Table I using N-($C_{11}$–$C_{14}$ sec-alkyl)acetamide, as used in Example I, for the charge.

of the first receiver, was analyzed by gas chromatographic techniques and the analyses are shown in Tables II, III, and IV.

The term "superficial velocity" used in the tables expresses the mole feed rate of crude amide divided by the cross-sectional area of catalyst.

TABLE I

| Catalyst | Pot temp., °C. | Cat. temp., °C. | NH3 flow Rate, l./min. | NH3 flow Time, hours | Charge, grams | Crude product, grams | Residue, grams | Analysis of crude product Amine | Analysis of crude product Amide | Analysis of crude product I.V. | N-($C_{11-14}$ sec-alkyl)amine, percent of theoretical |
|---|---|---|---|---|---|---|---|---|---|---|---|
| Filtrol 49 [1] | 230–250 | 270–290 | 2.0–3.2 | 4½ | 153.4 | 94.6 | 10.1 | 69.2 | 14.7 | 33.3 | 61.5 |
| Linde Molecular Sieve 13X [2] | 240–270 | 270–290 | 1.5–2.6 | 3¼ | 149.8 | 98.7 | 5.5 | 63.0 | 25.0 | 22.8 | 58.0 |
| MgO | 240–260 | 270–295 | 1.5–2.0 | 3½ | 150.3 | 109.3 | 18.6 | 10.3 | 84.3 | 6.0 | 20.2 |
| Glass beads | 240–260 | 280–320 | 2.0–3.2 | 3 | 156.4 | 126.9 | 11.4 | 6.6 | 90.9 | ......... | 7.8 |

[1] Filtrol 49 is a catalyst supplied by Filtrol Corporation having the following chemical analysis:

| Chemicals: | Weight percent |
|---|---|
| $SiO_2$ | 74.0 |
| $Al_2O_3$ | 17.5 |
| MgO | 4.5 |
| $Fe_2O_3$ | 1.4 |

Average pore size: 50 angstroms.

[2] Linde Molecular Sieve 13X is a catalyst supplied by the Linde Division of Union Carbide Corporation which is a crystalline sodium aluminosilicate having the formula

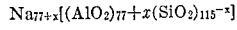

$$Na_{77+x}[(AlO_2)_{77+x}(SiO_2)_{115-x}]$$

where x equals 0 to 17, usually about 9.

Example XV

Various amides, types of catalysts, and amounts of catalysts were used in the following described apparatus. An olefinic acetamide and ammonia were metered into a heated vaporizer pot. The resulting vapors passed up through a Pyrex catalyst chamber where the transamidation occurred. The stream of olefinic amine, water, acetonitrile, ammonia, olefinic acetamide, and olefins then passed into a receiver maintained at 110–120° C. and fitted with a reflux condenser. The uncondensed vapors passed through the reflux condenser into a second receiver fitted with a Dry Ice condenser which condensed all of the remaining vapor. The first receiver contained amine, olefinic acetamide, some olefin, and a slight amount of moisture. The second receiver contained liquid ammonia, acetonitrile, and water. The crude product, the contents The above-described catalyst chamber, having a length of 25¾", was packed with 4 to 10-mesh bauxite which had been put through a No. 6 standard sieve. The results of several runs using N-($C_{11-14}$ sec-alkyl)acetamide feed are shown in Table II.

A second catalyst chamber, similar to the first, but made with mild steel, was added immediately after the first chamber and in series with the first chamber. Both of the catalyst chambers, having a total length of 49¾", were packed with bauxite catalyst described above. The results of several runs using the N-(sec-alkyl)acetamide feed indicated are shown in Table III.

The two catalyst chambers in series, as described above, were packed with $Al_2O_3$. The catalyst passed through a No. 6 standard sieve and was retained on a No. 12 screen. The results of several runs using the amide feed indicated are shown in Table IV.

TABLE II

| Feed rate Amide grams/min. | Feed rate NH3 liters/ min. | Moles NH3/mole amide | Superficial velocity, ft./sec. | Temp., °C. Pot | Temp., °C. Catalyst | Analysis of crude product Percent amine | Analysis of crude product Percent amide | Analysis of crude product Percent water | I.V. | Amine, percent of theory |
|---|---|---|---|---|---|---|---|---|---|---|

TABLE II

| Feed rate Amide grams/min. | Feed rate NH3 liters/ min. | Moles NH3/mole amide | Superficial velocity, ft./sec. | Temp., °C. Pot | Temp., °C. Catalyst | Analysis of crude product Percent amine | Analysis of crude product Percent amide | Analysis of crude product Percent water | I.V. | Amine, percent of theory |
|---|---|---|---|---|---|---|---|---|---|---|
| 2.97 | 2.6 | 10.4 | .662 | 305–315 | 290–300 | 83.1 | 4.3 | 2.4 | 18.3 | 101 |
| 3.1 | 1.75 | 6.67 | .478 | 305–310 | 295–300 | 82.2 | 9.3 | 1.2 | 16.5 | 92.2 |
| 3.18 | 1.0 | 3.74 | .312 | 315–330 | 295–305 | 61.6 | 35.1 | 1.1 | 16.0 | 100 |
| 3.15 | 2.6 | 8.9 | .672 | 295–305 | 295–310 | 80.8 | 13.3 | 1.1 | 15.9 | 98.7 |
| 1.87 | 1.2 | 7.58 | .309 | 300–310 | 275–280 | 70.1 | 25.9 | 1.0 | 12.9 | 96.3 |
| 3.26 | 3.5 | 12.7 | .905 | 310–315 | 310–325 | 78.6 | 6.3 | 1.1 | 24.2 | 88.5 |

TABLE III

| N-(sec-alkyl) acetamide | Feed rate Amide grams/ min. | Feed rate NH3 liters/ min. | Moles NH3/mole amide | Superficial velocity, ft./sec. | Temp., °C. Pot | Temp., °C. Catalyst | Analysis of crude product Percent amine | Analysis of crude product Percent amide | Analysis of crude product Percent water | I.V. | Amine, percent of theory |
|---|---|---|---|---|---|---|---|---|---|---|---|
| $C_{11-14}$ | 3.6 | 2.6 | 8.54 | .685 | 305–320 | 300 | 85.5 | 5.8 | 1.7 | 18.3 | 86.2 |
| $C_{11-14}$ | 3.27 | 2.6 | 9.43 | .678 | 300–310 | 300 | 87.1 | 3.5 | 1.4 | 21.6 | 90.7 |
| $C_{11-14}$ | 3.25 | 2.6 | 9.45 | .652 | 280–285 | 280 | 84.5 | 10.0 | 0.6 | 16.4 | 92.3 |
| $C_{7-9}$ | 2.62 | 2.6 | 8.28 | .667 | 260–270 | 280 | 63.5 | 24.5 | 6.8 | 14.7 | 97.5 |
| $C_{15-20}$ | 3.74 | 3.3 | 13.7 | .835 | 320–325 | 300–310 | 83.5 | 0.6 | 0.9 | 17.5 | 82.5 |

TABLE IV

| N-(sec-alkyl) acetamide | Feed rate Amide grams/ min. | Feed rate NH3 liters/ min. | Moles NH3/mole amide | Superficial velocity, ft./sec. | Temp., °C. Pot | Temp., °C. Catalyst | Analysis of crude product Percent amine | Analysis of crude product Percent amide | Analysis of crude product Percent water | I.V. | Amine, percent of theory |
|---|---|---|---|---|---|---|---|---|---|---|---|
| $C_{11-14}$ | 3.5 | 2.6 | 8.8 | .68 | 290–300 | 295–300 | 86.5 | 4.9 | 1.3 | 18.2 | 86.5 |
| $C_{15-20}$ | 3.16 | 3.8 | 18.2 | .925 | 300–310 | 295–300 | 90.0 | 0.6 | 0.9 | 15.9 | 87.7 |
| $C_8$ | 2.74 | 2.6 | 8.2 | .70 | 260–270 | 290–300 | 71.5 | 8.8 | 4.3 | ......... | 89.0 |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for preparing an amine having the formula

wherein R and R' are as defined below comprising reacting ammonia with an N-substituted amide having the formula

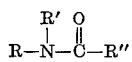

wherein R is selected from the group consisting of alkyl and alkenyl radicals having 1 to about 22 carbon atoms and their —$NH_2$ substituted derivatives, cycloalkyl radicals having 4 to 12 carbon atoms, and phenyl and its lower alkyl, and —$NH_2$ substituted derivatives; R' is selected from H and the same radicals as R, provided that the total number of carbon atoms in R and R' combined is less than about 30; and R'' is selected from H and the same radicals as R (provided that the total molecule contains less than 31 carbon atoms; said ammonia and N-substituted amide being present in a mole ratio of from about 1:1 to 70:1, at a temperature from about 200 to 350° C. in the presence of a nitrile forming catalyst to form said amine.

2. The process of claim 1 wherein said N-substituted amide is first introduced into a vaporizing chamber, said chamber being maintained at a temperature from about 200 to 350° C. to vaporize said N-substituted amide.

3. The process of claim 2 wherein said temperature is from about 220 to 300° C.

4. The process of claim 1 wherein said mole ratio is from about 6:1 to 12:1.

5. The process of claim 1 wherein said catalyst is bauxite.

6. The process of claim 1 wherein said catalyst is maintained at from about 250 to 320° C.

7. The process of claim 1 wherein said N-substituted amide is N-(sec-alkyl)acetamide.

8. The process of claim 1 wherein the pressure is from about 50 mm. to 3 atmospheres.

9. The process of claim 1 wherein said N-substituted amide is N-(sec-alkyl)acetamide, said ammonia and said N-(sec-alkyl)acetamide are present in a mole ratio of from about 6:1 to 12:1.

10. The process of claim 9 performed on a continuous basis wherein the amine is recovered by condensation and the excess ammonia is passed through an ammonia recovery system and recycled.

11. The process of claim 1 wherein R is an alkyl radical having 1 to about 22 carbon atoms.

12. The process of claim 1 wherein R is selected from the group consisting of alkyl radicals having 1 to about 22 carbon atoms and their —$NH_2$ substituted derivatives, cycloalkyl radicals having from 4 to 6 carbon atoms, and phenyl radicals and their lower alkyl substituted derivatives.

References Cited

UNITED STATES PATENTS

| | | | |
|---|---|---|---|
| 2,166,971 | 7/1939 | Schmidt et al. | 260—583(L) |
| 3,190,922 | 6/1965 | Le Bard et al. | 260—583(L) |
| 3,457,113 | 7/1969 | Tiefenthal et al. | 260—583(L) |
| 3,256,311 | 6/1966 | Becke et al. | 260—465.2 |

CHARLES B. PARKER, Primary Examiner

R. L. RAYMOND, Assistant Examiner

U.S. Cl. X.R.

260—465, 465.2, 563, 576, 577, 578